United States Patent
Wheeler

(12) 
(10) Patent No.: US 6,189,894 B1
(45) Date of Patent: Feb. 20, 2001

(54) URETHANE PACKING MEMBER WITH IMPROVED GEOMETRIC CONFIGURATION

(75) Inventor: Wallace T. Wheeler, Dallas, TX (US)

(73) Assignee: The Texacone Company, Mesquite, TX (US)

( * ) Notice: Under 35 U.S.C. 154(b), the term of this patent shall be extended for 0 days.

(21) Appl. No.: 09/294,407

(22) Filed: Apr. 19, 1999

(51) Int. Cl.[7] .................................................. F16J 15/32

(52) U.S. Cl. .......................................... 277/549; 277/560

(58) Field of Search .................................. 277/549, 560, 277/349, 402

(56) References Cited

U.S. PATENT DOCUMENTS

| | | | |
|---|---|---|---|
| 671,697 | * | 4/1901 | Hammon . |
| 2,052,603 | * | 9/1936 | Christenson . |
| 2,081,040 | * | 5/1937 | King . |
| 2,679,441 | * | 5/1954 | Stillwagon . |
| 2,884,291 | * | 4/1959 | Whitten . |
| 3,167,323 | * | 1/1965 | Appleton et al. . |
| 3,477,731 | * | 11/1969 | Workman . |
| 3,554,563 | * | 1/1971 | Schumacher et al. . |
| 3,594,012 | * | 7/1971 | Whittaker et al. . |

(List continued on next page.)

FOREIGN PATENT DOCUMENTS

478136 * 1/1938 (GB) .

OTHER PUBLICATIONS

UTEX Industries, Inc. brochure on Utex "KF" Design Ram Seals, from "Other Quality Products Available from Utex" (Undated).*
James Walker Group Companies brochure on Hydraulic Seals referencing Solosele Type G Seals, No. 74, document No. BP3099A390/fm (Undated).*
James Walker Group Companies brochure on Hydraulic Seals referencing Solosele Type G Seal, Type S Seal, Fabric/Rubber D Seals, document No. BP3099 281fm (Undated).*

* cited by examiner

Primary Examiner—Terry Lee Melius
Assistant Examiner—William L. Miller
(74) Attorney, Agent, or Firm—Edward I. Jorgenson; Philip G. Meyers; Intellectual Property Law, P.C.

(57) ABSTRACT

A packing member has a unique improved geometry particularly adapted to the manufacture of urethane seal having a Shore A hardness of from about 90 to about 100, the packing member including an annular body defining a central opening and an annular axis, the annular body having an upper sealing portion and a lower support portion and a groove extending into the upper sealing portion, the groove having an outer outwardly inclined wall, an inner inwardly wall and a bottom wall; the upper sealing portion of the annular body including radially extending inner and outer sealing lips formed adjacent to at least a portion of the groove, the outer sealing lip extending axially beyond the inner sealing lip. The inner sealing lip includes a first lower inwardly inclined surface, a second lower inwardly inclined surface, the second lower inwardly inclined surface being inwardly inclined at an angle greater than the first inwardly inclined surface, inner sealing lip also having a upper outwardly inclined surface, the upper outwardly inclined surface intersecting the second lower inwardly inclined surface to form a inner sealing edge, the inner sealing edge defining a first plane, the inner sealing lip having an upper surface defining a second plane, and the inner sealing lip being further defined by the inner wall of the groove. The outer sealing lip includes a outer lower outwardly inclined surface and an outer upper inwardly inclined surface, the outer upper inwardly inclined surface intersecting the outer lower outwardly inclined surface to form an outer sealing edge, the outer sealing edge defining a third plane, the outer upper inwardly inclined surface intersecting the outer wall of the grove, the intersection of the outer upper inwardly inclined surface with the outer wall of the grove forming an upper apex of said packing member.

19 Claims, 3 Drawing Sheets

U.S. PATENT DOCUMENTS

| | | | |
|---|---|---|---|
| 3,719,366 | * | 3/1973 | Pippert . |
| 3,957,278 | * | 5/1976 | Rabe . |
| 4,166,628 | * | 9/1979 | Blaydon . |
| 4,169,604 | * | 10/1979 | Heathcott . |
| 4,252,352 | * | 2/1981 | Scannell . |
| 4,310,163 | * | 1/1982 | Pippert . |
| 4,417,503 | * | 11/1983 | Izuni . |
| 4,428,590 | * | 1/1984 | Pippert et al. . |
| 4,504,068 | * | 3/1985 | Holzer . |
| 4,553,761 | * | 11/1985 | Blesing et al. . |
| 4,566,702 | * | 1/1986 | Traub . |
| 4,850,601 | * | 7/1989 | Maier et al. . |
| 5,139,274 | * | 8/1992 | Oseman . |
| 5,163,692 | * | 11/1992 | Schofield et al. . |
| 5,169,160 | * | 12/1992 | Gaskill et al. . |
| 5,306,021 | * | 4/1994 | Morvant . |
| 5,431,415 | * | 7/1995 | Millonig et al. . |
| 5,507,505 | * | 4/1996 | Von-Arndt . |
| 5,509,670 | * | 4/1996 | Wheeler . |
| 6,029,979 | * | 2/2000 | Grosspietsch et al. . |
| 6,045,137 | * | 4/2000 | Friend et al. . |

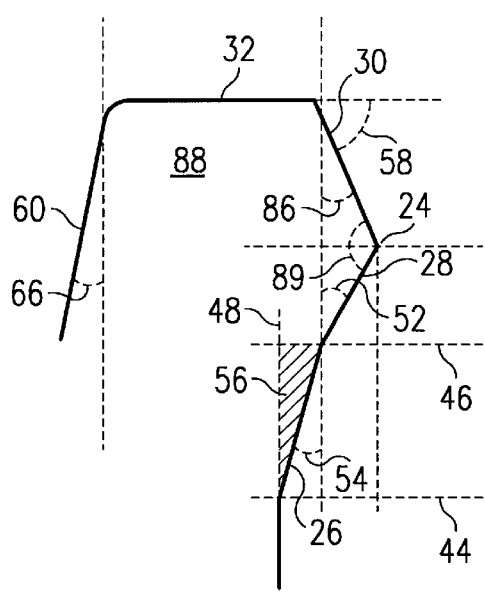
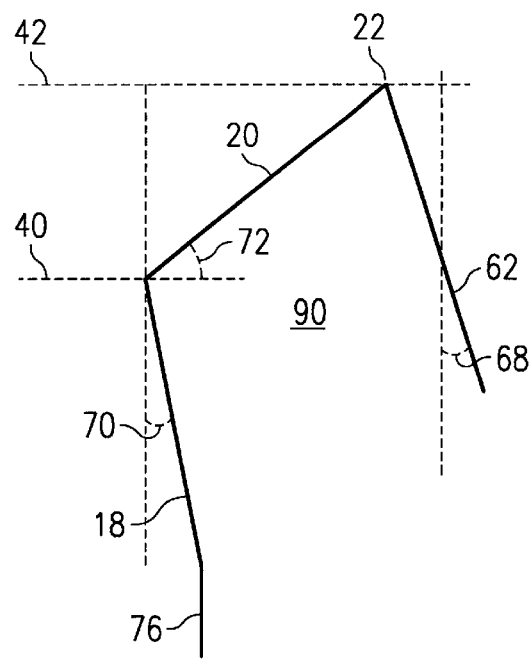
FIG. 4
FIG. 5
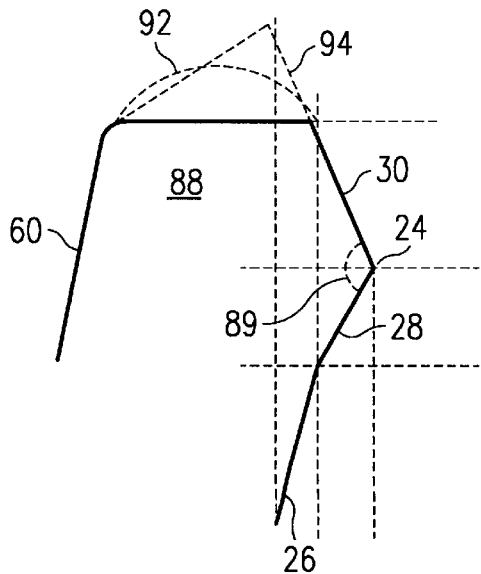
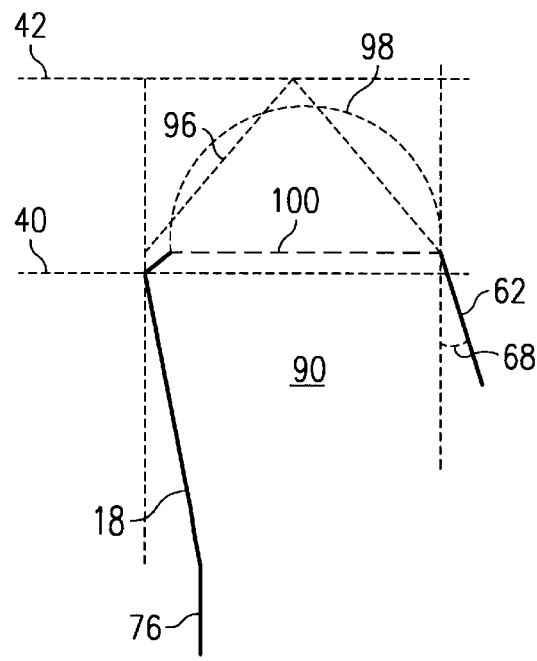
FIG. 4a
FIG. 5a

URETHANE PACKING MEMBER WITH IMPROVED GEOMETRIC CONFIGURATION

TECHNICAL FIELD

The present invention relates to hydraulic sealing devices and more particularly to an improved packing member or seal for forming a seal between a cylinder and a moveable shaft extending through the cylinder.

BACKGROUND OF THE INVENTION

It is common practice to form a seal between the wall of an opening and a shaft or other cylindrical member extending through the opening by positioning a packing member between the wall of the opening and the outer surface of the member. Packing members are typically annular bodies having a generally V-shaped or truncated V-shaped cross-section. Packing members are, in many cases, formed from an elastomeric material such as rubber or plastic. Such packing members are disclosed in U.S. Pat. No. 5,509,670 issued Apr. 23, 1996, and 5,704,615, issued Jan. 6, 1998, the disclosures of which are incorporated by reference herein for all purposes.

The operation of a device such as a hydraulic cylinder typically involves both static and dynamic forces generated by the friction between the packing member and the cylinder shaft. Static friction must be overcome during the initial actuation of the cylinder whereas dynamic friction is encountered during continued movement of the shaft. The amount of friction between the shaft and the packing member is determined by a number of factors including the amount of surface area of the packing member in contact with the shaft. Preferably, the amount of friction between the shaft and the packing member is minimized while maintaining an effective seal. The amount of force required to overcome static friction and initially move the shaft is typically greater than the force required to overcome dynamic friction after the shaft has started moving. Since the amount of force required to overcome static friction is greater than the amount of force needed to overcome dynamic friction, static friction is an important consideration in the selection and design of packing members. Moreover, during the operation of a hydraulic cylinder, a large difference between the force required to overcome static friction and the force required to overcome dynamic friction may result in the cylinder jerking or "stuttering" during operation. Large hydraulic and mechanical stresses can be generated when a hydraulic cylinder jerks in such a manner, stresses that may damage or cause excessive wear of system components, for example, hydraulic valves, fittings and the hydraulic pump supplying pressurized fluid to the cylinder. Consequently, it is desirable not only that the friction between a packing member and a slidable member passing through the packing member be minimized, but also that the difference in the amount of force required to overcome static versus dynamic friction be minimized.

It is also important that a packing member or seal be formed from a readily available, economically feasible material. One such material is urethane. Some types of urethane have many desirable properties including increased resistance to abrasion and wear as compared to other plastics and elastomers. Urethane is also generally more resistance to cuts and tears than other plastics or elastomers, tends to non-brittle at higher hardness, resisting fracture during shock and impact loading, and maintains dimensional stability over a wide range of temperatures. One drawback to the use of urethane to form packing members or hydraulic seals is the tendency to stick during operation. Thus, it is desirable to reduce the amount of contact between the seal and the cylinder. However, adequate support must also be provided to the sealing edge of the packing or seal, and reducing the size of the contact area alone does not completely address the problem.

SUMMARY OF THE INVENTION

The present invention provides a packing member with an improved geometric configuration that results in reduced friction while simultaneously providing the sealing edge of the member with adequate structural support. The improved geometry of the member also provides reduced a static/dynamic load ratio.

In one embodiment, the packing member includes: (1) an annular body defining a central opening and an annular axis, said annular body having an upper sealing portion and a lower support portion; (2) the annular body further defining a groove extending into said upper sealing portion, the groove having an outer, outwardly inclined wall, an inner, inwardly inclined wall and a bottom wall; (3) the upper sealing portion of the annular body including radially extending inner and outer sealing lips formed adjacent to at least a portion of the groove, the outer sealing lip extending axially beyond the inner sealing lip; (4) the inner sealing lip including a first lower inwardly inclined surface and a second lower inwardly inclined surface, the second lower inwardly inclined surface being inwardly inclined at an angle greater than the first lower inwardly inclined surface; (5) the inner sealing lip further also including upper outwardly inclined surface, the upper outwardly inclined surface intersecting the second lower inwardly inclined surface, the intersection of the second lower inwardly inclined surface with the upper outwardly inclined surface forming an inner sealing edge which defines a first plane; and (6) an upper sealing lip surface, the upper surface defining a second plane, said inner sealing lip being further defined by the inner, inwardly inclined wall of the groove. The packing member also includes a lower generally cylindrical support portion, the lower support section having an annular inner support wall, an annular outer support wall, and a bottom wall. The intersection of the annular inner support wall and the first lower outwardly inclined surface of the inner sealing lip defines a fifth plane, and the intersection of the first lower inwardly inclined surface of the inner sealing lip and the second lower inwardly inclined surface of the inner sealing lip defines a sixth plane. The annular inner support wall and annular outer support wall define substantially concentric parallel inner and outer cylinders. The packing member thus forms an annular support gusset defined by the inner cylinder, first lower inwardly inclined surface of the inner sealing lip, and the sixth plane. The annular gusset extends around at least a portion of the packing member and supports at least a portion of the inner sealing lip extending above the sixth plane.

The geometry of the packing member is particularly applicable to the manufacture of seals from a urethane composition having a Shore A hardness of from about 90 to about 100, providing reduced friction due at least in part to the support provided to the inner sealing edge by the annular gusset.

BRIEF DESCRIPTION OF THE DRAWINGS

FIG. 4 is an enlarged partial cross-sectional view of the inner sealing lip of the packing member of FIG. 1;

FIG. 4(a) is an enlarged partial cross-sectional view of the inner sealing lip of the packing member of FIG. 1 showing alternate configuration of the packing member;

FIG. 5 is an enlarged partial cross-sectional view of the outer sealing lip of the packing member of FIG. 1; and FIG. 5(a) is an enlarged partial cross-sectional view of the outer sealing lip of the packing member of FIG. 1 illustrating alternated configurations of the packing member.

DETAILED DESCRIPTION

Figure 1:
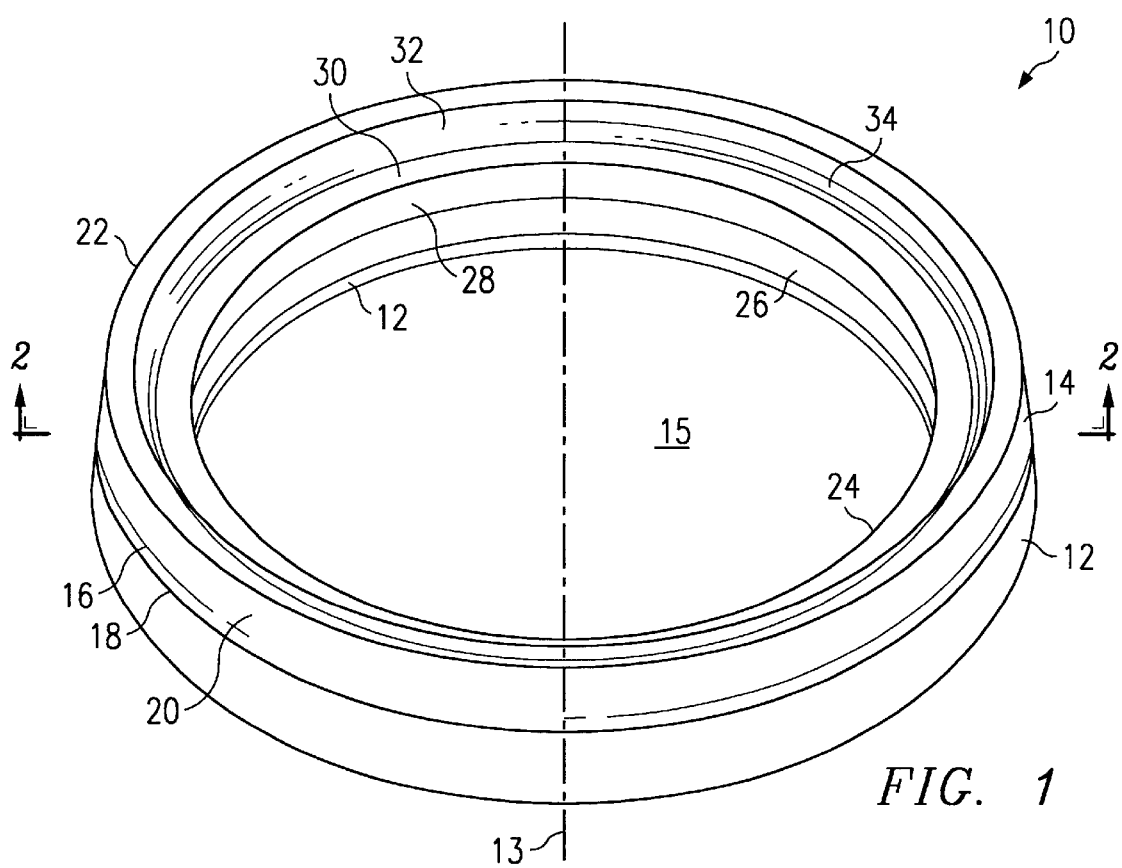
FIG. 1 is a perspective drawing of one embodiment of a packing member of the present invention.
Figure 3:
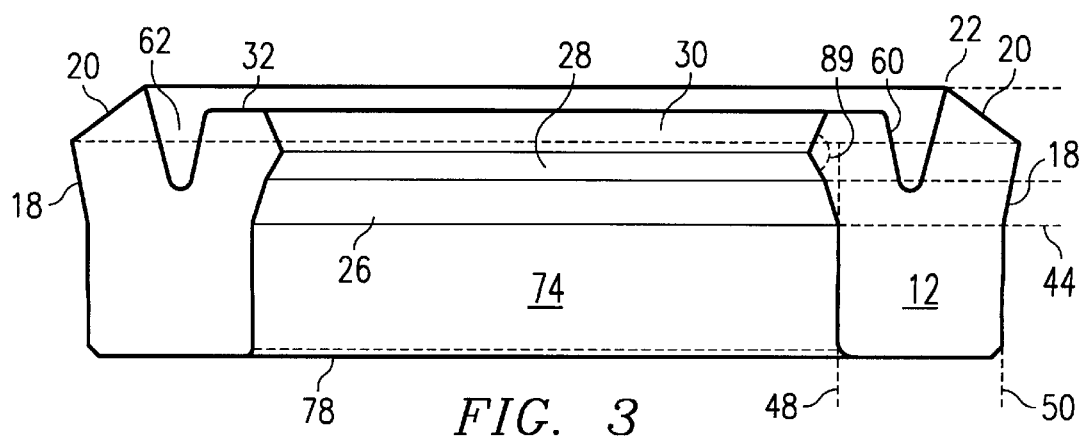
FIG. 3 is a vertical sectional view of the packing member shown in FIG. 2.
Figure 2:
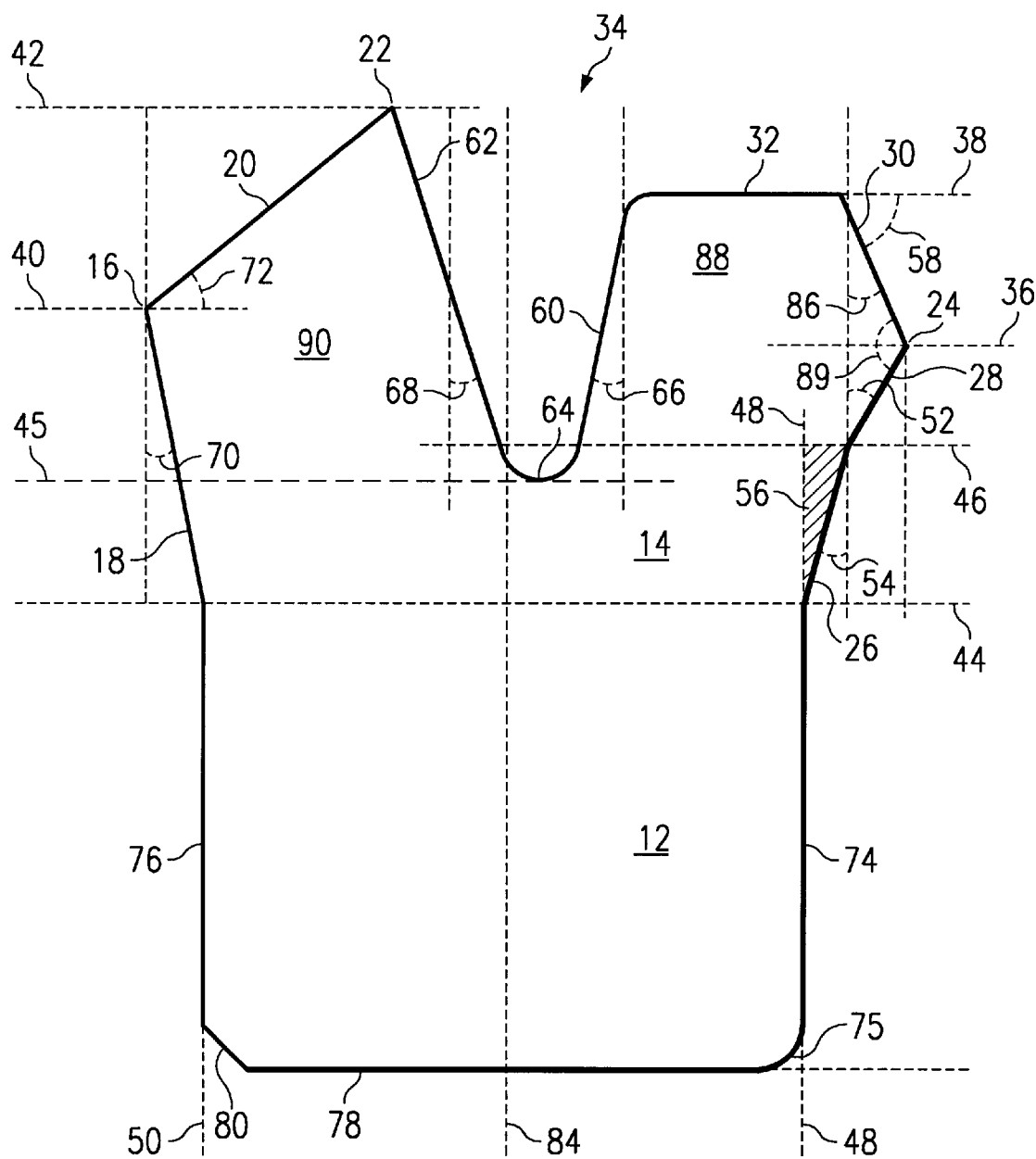
FIG. 2 is an enlarged partial vertical sectional view of the packing member as illustrated in FIG. 1 taken along line 2—2.

Referring now to the drawings where like reference characters designate like or similar parts throughout, and specifically to FIGS. 1–5, a first embodiment of a packing member 10 in accordance with the present invention is illustrated therein. Packing member 10 comprises an annular body defining a central circular opening 15 and annular axis 13, and includes a lower, generally cylindrical support section 12 including an annular inner support wall 74, an annular outer support wall 76, and bottom wall 78. The annular inner support wall 74, an annular outer support wall 76, and bottom wall 78 define the substantially rectangular cross-sectional configuration of support section 12. The intersection of the outer annular support wall 76 and bottom support wall comprises a chamfer 80 whereas the intersection of inner annular support wall and bottom wall 78 comprises a rounded section 75. The inner annular support wall 74 and outer annular support wall 76 define a pair of substantially parallel concentric cylinders 48 and 50, respectively. Concentric cylinders 48 and 50 define a third, centrally located cylinder 84, interposed between and generally parallel to inner cylinder 48 and outer cylinder 50.

The upper sealing portion includes an inner sealing lip 88, an outer sealing lip 90, and a groove 34 positioned between the inner and outer sealing lips. The groove 34 is defined by an inwardly inclined inner wall 60, an outwardly inclined outer wall 62, and bottom wall 64. As shown, bottom wall 64 has a generally semicircular configuration between inner wall 60 and outer wall 62.

The outer sealing lip includes an outer, outwardly inclined surface 18 that intersects an outer, inwardly inclined surface 20 to define an outer sealing edge 16. The intersection of the outer, outwardly inclined surface 18 and outer, inwardly inclined surface 20, also defines a third plane 40. The outer, inwardly inclined surface 20 intersects the outer, outwardly inclined wall 62 of groove 34 at apex 22. Outwardly inclined surface 18 is inclined away from annular axis at an angle 70 of from about 5° to about 15° degrees and preferably at an angle of about 8°. Outer, inwardly inclined surface 20 is inwardly inclined at an angle 72 of from about 10° to about 40° and preferably at an angle of 30°, whereas the outer, outwardly inclined wall 62 of groove 34 is outwardly inclined at an angle 68 of from about 5° to about 15° degrees, and preferably at an angle of about 8°. As will be appreciated, the terms "inner," "inwardly," "outer" and "outwardly" are used with reference to annular axis 13, with "inwardly inclined" describing an incline directed toward the annular axis 13 and "outwardly inclined" describing an incline directed away from the annular axis 13. Also, the terms "upper" and "lower" as used herein are with reference to bottom wall 78 of support section 14 as being the bottom or lower portion of member 10, and apex 22 being the top or upper portion of member 10. Further, as used herein, the term "axial" is used in reference to annular axis 13, e.g., parallel to the annular axis. The term "radial" is also used herein with reference to annular axis 13, e.g., perpendicular to the annular axis. Inner sealing lip 88 includes a first, lower inwardly inclined inner surface 26 that is inclined toward the annular axis 13 at an angle 54 of from about 15° to about 25° and preferable at 19°. A second lower inwardly inclined surface 28 extends upwardly from the first, lower inclined surface, with the intersection of the first, lower, inwardly inclined surface and the second, lower inwardly inclined surface defining a sixth plane 46. Second lower inwardly inclined surface 28 is inwardly inclined toward the annular axis 13 at an angle 52 of from about 30° to about 40° and preferably at an angle of 35°. As illustrated, the intersection of first, lower inwardly inclined surface 26, sixth plane 46, and inner cylinder 48 define an annular gusset 56 having a generally triangular cross-sectional area. As shown, annular gusset 56 extends around the perimeter of packing member 10, however, it is contemplated that annular gusset 56 may extend partially or intermittently around the perimeter of packing member 10 so long as it performs the support and reinforcing function described in detail below.

Inner sealing lip 88 also includes an upper outwardly inclined surface 30 that is outwardly inclined away from central axis 13 at an angle 86 of from about 10° to about 30° and preferably at an angle of 20°. Upper, outwardly inclined surface 30 intersects second, upper inwardly inclined surface to form inner sealing edge 24. Inner sealing edge 24 defines a first plane 36. Inner sealing lip has top horizontal surface that defines a second plane 38 parallel to first plane 36, third plane 40, fourth plane 42, and sixth plane 46. As shown, the intersection of inner annular support wall and first, lower inwardly inclined surface 26, and the intersection of outer annular support wall 76 and outer outwardly inclined surface 18 define a fifth plane 44 that is also parallel to first plane 36, which in turn is perpendicular to concentric cylinders 48, 50, and 84.

Top horizontal surface 32 of inner sealing lip 88 intersects inner, inclined wall 60 of groove 34. Inner, inwardly inclined wall 60 of groove 34 is inwardly inclined at an angle 66 of from 15° to about 35° and preferably at an angle of 25° and intersects semicircular bottom wall 64 of groove 34. As shown, the bottom of semicircular bottom wall 64 of groove 34 defines a seventh plane 45 extending parallel to first plane 36.

In operation, the upper portion 14 of the packing member 10 is subject to compressive forces that tend to urge inner sealing lip 88 into sealing engagement with a shaft or other cylindrical member inserted within opening 15 that is to be sealed against the passage of a fluid such as hydraulic fluid. The compressive forces also tend to force outer sealing lip 90 into sealing engagement with a separate surrounding member.

As will be appreciated, the angle 89 formed by the intersection of second, lower inwardly inclined surface and upper outwardly inclined surface 30 varies from an angle of from about 110° to about 140°, and preferably the angle 89 is 135°. This provides an inner sealing edge 24 that minimizes surface contact of the packing member 10 with a cylinder (not shown) passing through central opening 15, especially when the packing member is in a compressed state. Simultaneously, gusset 56 serves to reinforce the section of the inner sealing lip between the first and sixth planes, e.g., the portion of the sealing lip between the sealing edge 24 and the intersection of the first, lower inwardly inclined surface 26 and the second, lower inwardly inclined surface 28, preventing the sealing edge from flexing excessively during operation. Excessive flexing of the sealing edge 24 is believe to contribute to cylinder chatter or "stuttering" during operation of the cylinder. Further, the apex 22 of the outer sealing lip 90 (corresponding to the fourth plane 46) is positioned higher than the top horizontal surface 32 (corresponding to the second plane 36). Thus, the outer sealing lip is engaged first if the cylinder bottoms out, thereby protecting the inner sealing lip 88 from excessive compression that would increase the contact area between the inner sealing lip 88 and the cylinder shaft (not shown), resulting in additional friction and stuttering of the cylinder. Thus, the geometry of the inner sealing lip 88, as defined by angles 52, 54, 86 and 89 along with first, second, and fifth planes 44, 46 and 36, respectively, provides a sealing edge that minimizes the amount of surface contact between the packing member 10 and a cylinder shaft (not shown) while being adequately supported by gusset 56 to prevent flexing and the resulting excessive friction and stuttering. Additionally, the profile of the outer sealing lip 90, extending above the inner sealing lip 88, serves to protect the inner sealing lip 88 from excessive compression during operation, especially if the cylinder happens to bottom out.

In conventional prior art "U" shaped packing members, the bottom of the "U" is positioned well below the inner sealing surface of the packing. Thus, a force applied radially against the inside sealing surface of a conventional "U" shaped packing member tends to cause the inside leg of the "U" to flex in a hinge-like manner around the bottom of the "U". In contrast, the inner sealing lip 88 of the packing member 10 of the invention includes and is reinforced by annular gusset 56 to prevent this type of flexing, increasing the effectiveness of the packing member 10 in forming a seal around a slidable member, such as cylinder shaft passing through the packing member 10.

Referring now to FIGS. 4(a) and 5(a), alternate embodiments of the invention are illustrated. In particular, referring to FIG. 4(a), two alternate configurations for inner sealing lip 88 are illustrated. In the first alternate configuration, top horizontal surface 32 of inner sealing lip 88 is replaced with an arcuate upwardly extending surface illustrated by dashed line 92. In a second alternated configuration, top horizontal surface 32 of inner sealing lip 88 is replaced with a generally triangular upper surface illustrated by dashed line 94. In either case, the configuration of the inner sealing lip 34 and annular gusset 56, as defined by angles 52, 54, 86 and 89, first, second and fifth planes 44, 46 and 36 and inner cylinder 48, is maintained to provide the desired sealing and reinforcing functions.

Turning now to FIG. 5(a), three alternate configurations for outer sealing lip 99 are illustrated. In the first alternate configuration, the asymmetrical configuration define by upper inwardly inclined surface 20 and outer outwardly inclined wall 62 of grove 34 is replaced with a generally symmetrical triangular configuration as illustrated by dotted line 96. A second alternate configuration is illustrated by dotted line 98 which outlines an upwardly extending arcuate configuration. In each these cases, the uppermost portion of outer sealing lip 90 (corresponding to fourth plane 42) extends upwardly beyond the topmost portion of the inner sealing lip 88 (corresponding to third plane 40) thereby retaining the function of engaging first and protecting the inner sealing lip 88 from excessive compression. A third alternative is also shown wherein the asymmetrical configuration define by upper inwardly inclined surface 20 and outer outwardly inclined wall 62 of grove 34 is replaced with a generally flat, horizontal configuration as illustrated by dotted line 100. Although possible, this configuration is generally not favored unless the upper most portion of the outer sealing lip 90 is maintained an adequate distance above the uppermost portion of the inner sealing lip so as to ensure that the outer sealing lip 90 retains the function of engaging first to protect the inner sealing lip 88 from excessive compression.

As illustrated and described above, the improved geometric configuration of the packing member of the invention is applicable for use with suitable rubbers, plastics and composite materials. However, the improved geometry of the packing member is particularly applicable in the case of urethane due to the tendency of packing members formed form urethane to "stick" during operation. While a number of different types of urethane may be used, it has been found that a urethane that cures to a Shore A hardness of between about 90 and 100 is preferable with a Shore A hardness of about 95 being most preferable. The term "about" is used in conjunction with the foregoing Shore A hardness ranges and values to encompass minor variations resulting from the inherent variability of the hardness test.

One urethane formulation suitable for use in connection with the manufacture of the packing member of the invention is ADIPRENE PP 1096, a PPDI (p-phenylene diisocyanate) terminated polycaprolactone prepolymer available from Uniroyal Chemical Chemical Company, Inc., Middlebury Conn. 06749. The polycaprolactone prepolymer may be cured with catalysts or curing agents also available from Uniroyal Chemical Chemical Company, Inc. under the designations VIBRACURE® A 250 and HQEE. When cured, urethane formed from these compositions has a reported Shore A hardness of 93–96, a 100% modulus of 1400–1500 psi, a 300% modulus of 1600 to 2000 psi, a tensile of 6500 to 7000 psi, an elongation of 580–600%, and a tear strength of 140–150 pli. It is anticipated that similar urethane formulations may be equally applicable in the practice of the invention. In the manufacture of one embodiment of the packing member of the invention, the prepolymer and catalyst are mixed and the liquid mixture is poured or injected into a preheated mold. After curing, the packing member is withdrawn from the mold, allowed to finish curing and trimmed to remove excess material.

The operation of a device such as a hydraulic cylinder typically involves both static and dynamic forces generated by the friction between the packing member and the shaft. Static friction must be overcome during the initial actuation of the cylinder whereas dynamic friction is encountered during continued movement of the shaft. The amount of friction between the shaft and the packing member is determined by a number of factors, including the amount of surface area of the packing member in contact with the shaft. Preferably, the amount of friction between the shaft and the packing member is minimized while maintaining an effective seal.

In order to illustrate the advantages of the present invention, a test was conducted to compare the force required to push a piston through a packing member of the present invention versus a packing member of the type generally disclosed in U.S. Pat. No. 4,526,385. The test apparatus consisted of a three-and-seven-eighths-inch (3⅞") piston and a pair of stuffing boxes bolted together. Each of the stuffing boxes was fitted with a bearing, wiper, and packing member of the type disclosed and claimed herein. The stuffing box assembly was mounted in a frame with the piston passing through the stuffing boxes. The stuffing box assembly was pressurized with hydraulic fluid to 100, 300, 500 and 700 psi and a winch was used to pull the piston through the pressurized stuffing box assembly. A 5000 pound force load cell, connected to the winch cable, was used to measure the force required to overcome static and dynamic resistance. The piston was pulled through the stuffing box assembly at a constant rate of approximately 10 ft/min. The peak force measured at the time the piston began moving was recorded as the static load. After the piston began moving, additional readings were taken, averaged, and reported as the dynamic load. In each case the tests were repeated eight times to obtain the averages values set forth in Table 1 below.

TABLE 1

| PRESSURE | STATIC LOAD | DYNAMIC LOAD | RATIO-STATIC/ DYNAMIC LOADS |
|---|---|---|---|
| 100 psi | 148 lb. | 133 lb. | 1.11 |
| 300 psi | 185 lb. | 148 lb. | 1.25 |
| 500 psi | 229 lb. | 158 lb. | 1.45 |
| 700 psi | 282 lb. | 230 lb. | 1.23 |
| Average | 211 lb. | 167 lb. | 1.26 |

The test was repeated with a packing member of the type generally disclosed in U.S. Pat. No. 5,509,670. The results of the test are set forth in Table 2 below.

TABLE 2

| PRESSURE | STATIC LOAD | DYNAMIC LOAD | RATIO-STATIC/ DYNAMIC LOADS |
|---|---|---|---|
| 100 psi | 221 lb. | 224 lb. | 0.98 |
| 300 psi | 321 lb. | 304 lb. | 1.06 |
| 500 psi | 347 lb. | 317 lb. | 1.09 |
| 700 psi | 360 lb. | 316 lb. | 1.14 |
| Average | 312 lb. | 290 | 1.14 |

As can be observed from a comparison of Tables 1 and 2, use of the packing member of the present invention results in lower static and dynamic loads throughout the four pressure ranges tested. Although the packing member of the invention proved to be higher, albeit acceptable, static/dynamic load ratios, it is believed that the higher values are in due in part to the overall lower loads and the greater tendency of urethane to stick, which tends to increase the static load relative to the dynamic load.

Although the invention has been described in conjunction with the drawings and the foregoing detailed description, it will be understood that the invention is not limited to the embodiment disclosed, but is capable of numerous modifications without departing from the spirit and scope of the invention.

What is claimed is:

1. A packing member comprising:

an annular body defining a central opening and an annular axis, said annular body having an upper sealing portion and a lower support portion;

said annular body further defining a groove extending into said upper sealing portion, the groove having an outer outwardly inclined wall, an inner inwardly wall and a bottom wall;

the upper sealing portion of the annular body including radially extending inner and outer sealing lips formed adjacent to at least a portion of the groove, the outer sealing lip extending axially beyond the inner sealing lip;

the inner sealing lip further comprising a first lower inwardly inclined surface, a second lower inwardly inclined surface, said second lower inwardly inclined surface being inwardly inclined at an angle greater than the first inwardly inclined surface;

said inner sealing lip further comprising a upper outwardly inclined surface, the upper outwardly inclined surface intersecting the second lower inwardly inclined surface, the intersection of the second lower inwardly inclined surface with the upper outwardly inclined surface forming an inner sealing edge, the inner sealing edge defining a first plane;

said inner sealing lip further comprising an upper surface, the upper surface defining a second plane, said inner sealing lip being further defined by the inner wall of the groove;

the outer sealing lip further comprising an outer lower outwardly inclined surface and an outer upper inwardly inclined surface, the outer upper inwardly inclined surface intersecting the outer lower outwardly inclined surface, the intersection of the outer upper inwardly inclined surface and outer lower outwardly inclined surface forming an outer sealing edge, the outer sealing edge defining a third plane; and the outer upper inwardly inclined surface intersecting the outer wall of the grove, the intersection of the outer upper inwardly inclined surface with the outer wall of the grove forming an upper apex of said packing member, the upper apex defining a fourth plane.

2. The packing member of claim 1 wherein the first, second, third and fourth planes are each parallel to each other and substantially perpendicular to said annular axis.

3. The packing member of claim 1 wherein the third horizontal plane is interposed between the first and second planes.

4. The packing member of claim 1 wherein the packing member is formed from a plastic material having a Shore A hardness from about 90 to about 100.

5. The packing member of claim 1 wherein the packing member is formed from a urethane material having a Shore A hardness of about 90 to about 100.

6. The packing member of claim 1 wherein the the lower support section includes an annular inner support wall, an annular outer support wall and a bottom wall, the annular inner support wall, annular outer support wall and bottom wall defining a substantially rectangular cross-section.

7. The packing member of claim 6 wherein the uppermost portion of the lower support section defines a fifth plane, the annular inner support wall intersecting the first lower outwardly inclined surface of the inner sealing lip adjacent to the fifth plane, the annular outer support wall intersecting the outer lower outwardly inclined surface of the outer sealing lip adjacent to the fifth plane.

8. The packing member of claim 7 wherein the lower support section is substantially rectangular in cross-section and wherein the fifth plane is substantially parallel to the first, second, third and fourth planes.

9. The packing member of claim 6 wherein the annular inner support wall and annular outer support wall define substantially concentric parallel inner and outer cylinders, each of said cylinders being parallel to the annular axis.

10. The packing member of claim 9 wherein the intersection of the first lower inwardly inclined surface of the inner sealing lip and the second lower inwardly inclined surface of the inner sealing lip define a sixth plane, and wherein the inner cylinder and the first lower inwardly inclined surface of the inner sealing lip intersect adjacent to the fifth plane and wherein the inner cylinder, first lower inwardly inclined surface of the inner sealing lip, and the sixth plane define an annular gusset extending around a portion of the packing member and supporting the portion of the inner sealing lip extending above the sixth plane.

11. The packing member of claim 10 wherein the annular gusset is substantially triangular in cross section.

12. A packing member comprising:
an annular body defining a central opening and an annular axis, said annular body having an upper sealing portion and a lower support portion, the lower support portion including an outer annular wall;
said annular body further defining a groove extending into said upper sealing portion, the groove having an outer outwardly inclined wall, an inner inwardly inclined wall and a bottom wall;
the upper sealing portion of the annular body including radially extending inner and outer sealing lips formed adjacent to at least a portion of the groove, the outer sealing lip extending axially beyond the inner sealing lip;
the inner sealing lip further comprising a first lower inwardly inclined surface, a second lower inwardly inclined surface, the second lower inwardly inclined surface being inwardly inclined at an angle greater than the first lower inwardly inclined surface, the first lower inwardly inclined surface intersecting the annular outer wall of the lower support section;
said inner sealing lip further comprising an upper outwardly inclined surface, the upper outwardly inclined surface intersecting the second lower inwardly inclined surface, the intersection of the second lower inwardly inclined surface with the upper outwardly inclined surface forming an inner sealing edge, the inner sealing edge defining a first plane; and
said inner sealing lip further comprising an upper surface, the upper surface defining a second plane, said inner sealing lip being further defined by the inner, inwardly inclined wall of the groove.

13. The packing member of claim 12 wherein the lower support section comprises an annular inner wall and a bottom wall, the intersection of the annular inner wall and the first lower outwardly inclined surface of the inner sealing lip defining a fifth plane, the intersection of the first lower inwardly inclined surface of the inner sealing lip and the second lower inwardly inclined surface of the inner sealing lip defining a sixth plane, the annular inner wall and annular outer wall defining substantially concentric parallel inner and outer cylinders; and
a gusset defined by the inner cylinder, first lower inwardly inclined surface of the inner sealing lip and the sixth plane, the gusset extending around at least a portion of the packing member and supporting at least a portion of the inner sealing lip extending above the sixth plane.

14. The packing member of claim 13 wherein the lower support section is substantially rectangular in cross-section and wherein the fifth plane is substantially parallel to the first, second and sixth planes.

15. The packing member of claim 13 wherein the packing member is formed from a urethane material having a Shore A hardness of about 95.

16. The packing member of claim 13 wherein the gusset is substantially triangular in cross section.

17. The packing member of claim 12 wherein the packing member is formed from a plastic material having a Shore A hardness from about 90 to about 100.

18. The packing member of claim 12 wherein the outer sealing lip further comprises a outer lower outwardly inclined surface and an outer upper inwardly inclined surface, the outer upper inwardly inclined surface intersecting the outer lower outwardly inclined surface, the intersection of the outer upper inwardly inclined surface and outer lower outwardly inclined surface forming an outer sealing edge, the outer sealing edge defining a third plane.

19. The packing member of claim 18 wherein the outer upper inwardly inclined surface intersects the outer outwardly inclined wall of the grove, the intersection of the outer upper inwardly inclined surface with the outer outwardly inclined wall of the grove forming an upper apex of said packing member, the upper apex defining a fourth plane.

\* \* \* \* \*